United States Patent
Urmanov et al.

(10) Patent No.: US 7,487,401 B2
(45) Date of Patent: Feb. 3, 2009

(54) METHOD AND APPARATUS FOR DETECTING THE ONSET OF HARD DISK FAILURES

(75) Inventors: Aleksey M. Urmanov, San Diego, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 613 days.

(21) Appl. No.: 11/205,472

(22) Filed: Aug. 16, 2005

(65) Prior Publication Data

US 2006/0212755 A1    Sep. 21, 2006

Related U.S. Application Data

(63) Continuation-in-part of application No. 10/222,611, filed on Aug. 16, 2002, now Pat. No. 6,957,365.

(51) Int. Cl.
G06F 11/00    (2006.01)
(52) U.S. Cl. ........................................................ 714/42
(58) Field of Classification Search .................. None
See application file for complete search history.

(56) References Cited

U.S. PATENT DOCUMENTS

| | | | | |
|---|---|---|---|---|
| 4,425,798 A * | 1/1984 | Nagai et al. | | 73/659 |
| 4,937,763 A | 6/1990 | Mott | | 364/550 |
| 5,251,151 A * | 10/1993 | Demjanenko et al. | | 702/56 |
| 5,734,579 A * | 3/1998 | Sakaguchi | | 702/78 |
| 6,415,189 B1 * | 7/2002 | Hajji | | 700/79 |
| 6,629,058 B2 * | 9/2003 | Komura et al. | | 702/183 |
| 6,771,440 B2 * | 8/2004 | Smith | | 360/31 |
| 2002/0038188 A1 | 3/2002 | Fioravanti | | 702/75 |
| 2005/0246591 A1 * | 11/2005 | Johnson et al. | | 714/47 |
| 2006/0212755 A1 | 9/2006 | Urmanov et al. | | 714/25 |

FOREIGN PATENT DOCUMENTS

JP    2004063040    2/2004

OTHER PUBLICATIONS

Randal et al., "The Relationship between Spectral Correlation and Envelope Analysis in the Diagnostics of Bearing Faults and Other Cyclostationary Mchine Signals", Mechanical Systems and Signal Processing, 2001, pp. 945-962.*
"Vibration Monitoring of Compultre Hard Disk Drives", Mechanical Systems and Signal Processing 20, 2006, www.sciencedirect.com.
"Transient and Steady State Dynamic Vibration Measurements of HDD", by Ki Myung Lee et al., IEEE, 2002.

* cited by examiner

*Primary Examiner*—Michael C Maskulinski
(74) *Attorney, Agent, or Firm*—Park, Vaughan & Fleming LLP

(57) ABSTRACT

A system that detects the onset of hard disk drive failure. During operation, the system measures vibrations from the hard disk drive to produce one or more vibration signals. Next, the system generates a vibration signature for the hard disk drive from the measured vibration signals. The system then determines if the vibration signature indicates the onset of hard disk failure by comparing the vibration signature with a reference vibration signature for the hard disk drive. If so, the system generates a warning or takes a remedial action.

18 Claims, 3 Drawing Sheets

METHOD AND APPARATUS FOR DETECTING THE ONSET OF HARD DISK FAILURES

RELATED APPLICATION

This application is a continuation-in-part of, and hereby claims priority under 35 U.S.C. § 120 to U.S. patent application Ser. No. 10/222,611, entitled "Method And Apparatus For Using Acoustic Signals To Identify Disk Drives That Are Likely To Fail," by inventors Kenny C. Gross and Wendy Lu, filed on 16 Aug. 2002 now U.S. Pat. No. 6,957,365. Furthermore, the above-listed application is hereby incorporated by reference herein to provide details of how to identify a failing disk drive by analyzing the acoustical frequency signature of the disk drive.

BACKGROUND

1. Field of the Invention

The present invention relates to techniques for providing fault-tolerance in computer systems. More specifically, the present invention relates to a method and apparatus for using vibration signatures to detect the onset of hard disk drive failures.

2. Related Art

As computer systems are becoming more powerful, they are increasingly being used to manipulate larger volumes of data and are being used to execute larger and more sophisticated computer programs. Today, computer systems often have a large number of hard disk drives. For example, a single server system can sometimes have as many as 15,000 hard disk drives.

An increasing number of businesses are using servers for mission critical applications. Losing or corrupting data stored on disk drives can have a devastating effect on such businesses. For example, airlines rely on the integrity of data stored in their reservation systems for most of their day-to-day operations, and would essentially cease to function if this data became lost or corrupted. Note that if hard disk drives are identified before they fail, preventative measures can be taken to avoid such catastrophes. Hence, identifying hard disk drives that are likely to fail is critically important.

Present techniques for identifying hard disk drives that are likely to fail have many drawbacks. One technique relies on analysis of internal counter-type variables, such as read retries, write retries, seek errors, dwell time (time between reads/writes). Unfortunately, these techniques suffer from a high missed-alarm probability (MAP) of 50%, and a false-alarm probability of 1% (FAP). The high MAP causes an increased probability of massive data loss. The FAP causes a large numbers of No-Trouble-Found (NTF) drives to be returned, resulting in increased warranty costs.

Another technique relies on monitoring internal hard disk drive discrete performance metrics. This technique usually monitors internal diagnostic counter-type variables called "SMART variables." However, hard disk drive manufacturers are reluctant to add extra diagnostics to monitor these variables, because doing so increases the cost of the commodity hard disk drives. Unfortunately, this technique also fails to identify approximately 50% of imminent hard disk drive failures.

To prevent catastrophic data loss due to hard disk drive failure, systems often use redundant arrays of inexpensive disks (RAID). Unfortunately, since the capacity of hard disk drives have increased dramatically in recent years, the time needed to rebuild a RAID disk after a failure of one of the disks has also increased dramatically. The rebuild process can take many hours to several days, during which the system is susceptible to a second hard disk drive failure which would result in massive data loss. Hence, even the most advanced redundancy-based solutions are susceptible to data loss. Furthermore, note that a RAID array tends to contain hard disk drives from the same manufacturing lot. This lot might have an age specific defect that was not caught during qualification tests of the lot. This can further increase the susceptibility of RAID arrays.

Hence, what is needed is a method and an apparatus for detecting the onset of hard disk drive failure without the above-described problems.

SUMMARY

One embodiment of the present invention provides a system that detects the onset of hard disk drive failure. During operation, the system measures vibrations from the hard disk drive to produce one or more vibration signals. Next, the system generates a vibration signature for the hard disk drive from the measured vibration signals. The system then determines if the vibration signature indicates the onset of hard disk failure by comparing the vibration signature with a reference vibration signature for the hard disk drive. If so, the system generates a warning or takes a remedial action.

In a variation on this embodiment, while generating the vibration signature for the hard disk drive from the measured vibration signals, the system computes the average of the vibration signals. Next, the system computes an envelope for the average of the vibration signals. The system then computes the Fourier transform of the envelope for the average of the vibration signals.

In a variation on this embodiment, while computing the average of the vibration signals, the system computes the average of the vibration signals. Next, the system discards two vibration signals that are farthest from the average. The system then computes the average of the vibration signals without the two discarded vibration signals.

In a variation on this embodiment, while computing the envelope for the average of the vibration signals, the system computes the Hilbert transform of the average of the vibration signals to produce an analytic vibration signal. The system then computes the envelope for the analytic vibration signal.

In a variation on this embodiment, prior to measuring the vibration signals, the system generates the reference vibration signature for the hard disk drive. The system then stores the reference vibration signature for the hard disk drive for comparison with vibration signatures generated during subsequent operation for the hard disk drive.

In a variation on this embodiment, while determining if the vibration signature indicates the onset of hard disk failure, the system determines if a difference between the vibration signature and the reference vibration signature is greater than a tolerance.

In a variation on this embodiment, while measuring vibrations from the hard disk drive to produce vibration signals, the system measures vibrations during an idle phase for the hard disk drive.

In a variation on this embodiment, the vibration signals are measured by an accelerometer.

DETAILED DESCRIPTION

Figure 1:
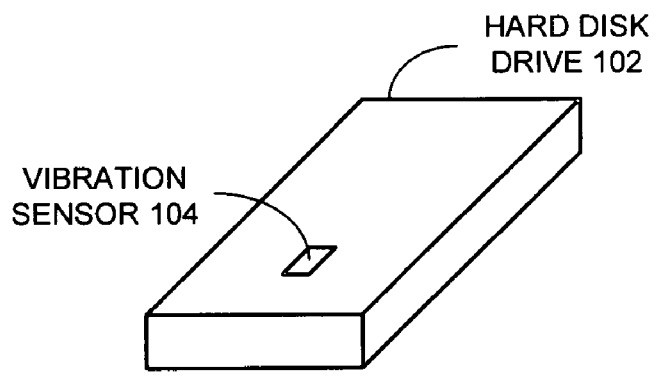
FIG. 1 presents a block diagram of a hard disk drive in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Detecting Hard Disk Drive Failure

Hard disk drive failures are typically caused by mechanical wear. Hard disk drives give out warning signs long before they fail permanently. Excessive temperature, abnormal head flying height, and a high number of correctable errors indicate the degrading health of a hard disk drive. These factors are typically used by the manufacturers to diagnose problems, including hard disk drive failure, but are not usually available to the user. Unfortunately, despite the use of the-state-of-the-art diagnostics internally in hard disk drives by the manufacturers, only about 10% of drive failures are detected before they occur.

Spindle motor failure can result from excessive heat due to a bearing failure. The increased heat resulting from a bearing failure will expand the drive shaft and cause the spindle motor to seize, thereby making the hard disk drive inoperative. A possible sign of impending hard disk drive failure is the hard disk drive spinning up and spinning down slower than normal when the hard disk drive is first powered-on. Clicking noises during start-up or during operation are another sign of a pending mechanical failure. However, it is difficult to define exact mechanical failure symptoms for hard disk drives.

Note that the bearings are never perfectly round. Hence, there is always some amount of vibration associated with metal ball bearings. Drives vibrate during idle and seek. Knocks and bumps can cause minor damage to the motor bearings and change the vibration signature. When drives are mounted in a chassis and enclosed in a box, the vibrations can be dampened or amplified.

The present invention monitors the health of hard disk drives in a storage system to proactively identify the onset of mechanical failures in hard disk drives by detecting significant deviations of the idle-vibration signature from a reference idle-vibration signature for the hard disk drive. In doing so, the present invention reduces the likelihood of multiple disk failures and the likelihood of data corruption and data loss. Note that the reference idle-vibration signature is the vibration signature of a healthy hard disk drive.

FIG. 1 presents a block diagram of hard disk drive 102 in accordance with an embodiment of the present invention. Hard disk drive 102 contains vibration sensor 104. Note that vibration sensor 104 can be any type of vibration sensor. Furthermore, vibration sensor 104 can be located on hard disk drive 102 or within the chassis containing hard disk drive 102. One embodiment of the present invention uses inexpensive commodity accelerometers as vibration sensors inside the hard disk drive array chassis. Digitized accelerometer signals are processed offline using a small fraction of a dedicated CPU that is deployed with the storage system.

One embodiment of the present invention supplements conventional SMART variable surveillance techniques and gives an early warning of incipient failures due to degradation of spindle bearings and of spindle motors, thereby enabling a system administrator to proactively schedule replacement of a hard disk drive before it fails. In doing so, the present invention reduces the Mean-Time-To-Replacement (MTTR), which reduces the probability of catastrophic failure of RAID arrays.

Figure 2:
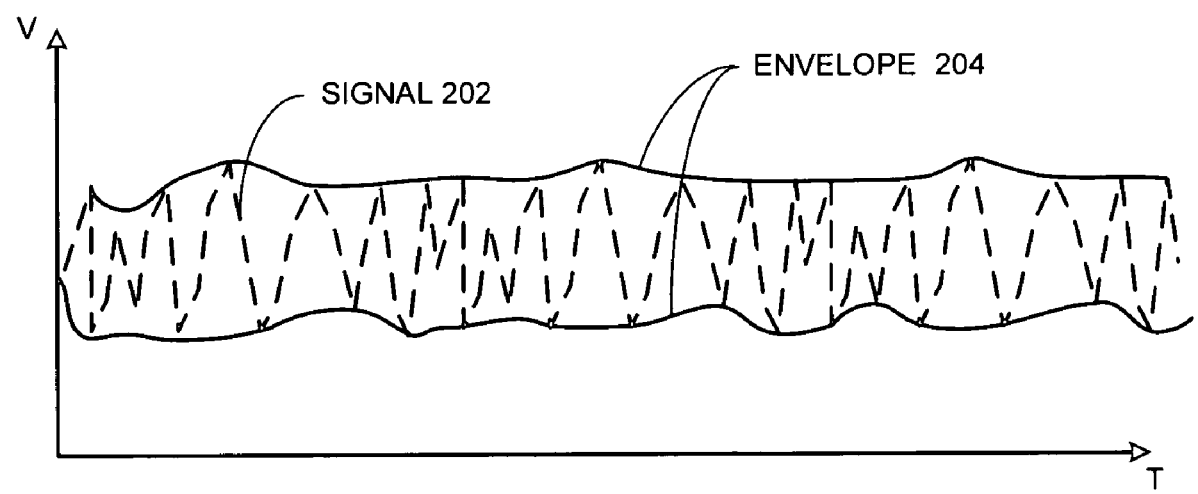
FIG. 2 illustrates a vibration signal output from a vibration sensor mounted on a hard disk drive in accordance with an embodiment of the present invention.

FIG. 2 illustrates a vibration signal output from a vibration sensor mounted on a hard disk drive in accordance with an embodiment of the present invention. It illustrates vibration signal 202 and envelope function 204. Note that envelope function 204 encloses vibration signal 202. Also note that the system identifies vibration sensor attachment points on a single hard disk drive or in a hard disk drive array, and collects vibration data from the chosen vibration sensors for known good, known defective, and suspect hard disk drives.

The following operations are performed by the system to proactively detect incipient failures. Vibration signal 202 is first preprocessed using a Hilbert transform to compute an analytical signal. Next, envelope function 204 is generated from the analytic signal and a Fourier transform is taken of envelope function 204 of the analytical signal. The Fourier transform is then analyzed in a frequency range which correlates with frequencies of vibrations that indicate the onset of mechanical degradation of the hard disk drive. The system then identifies deviations of the vibration signatures with respect to reference signatures to proactively detect incipient failures.

In one embodiment of the present invention, vibration sensors (i.e. commodity accelerometers) are attached to places where it is more probable to pick up vibration modes attributed to the defects or degradation of interest.

Computing a Vibration Signature

Figure 3:
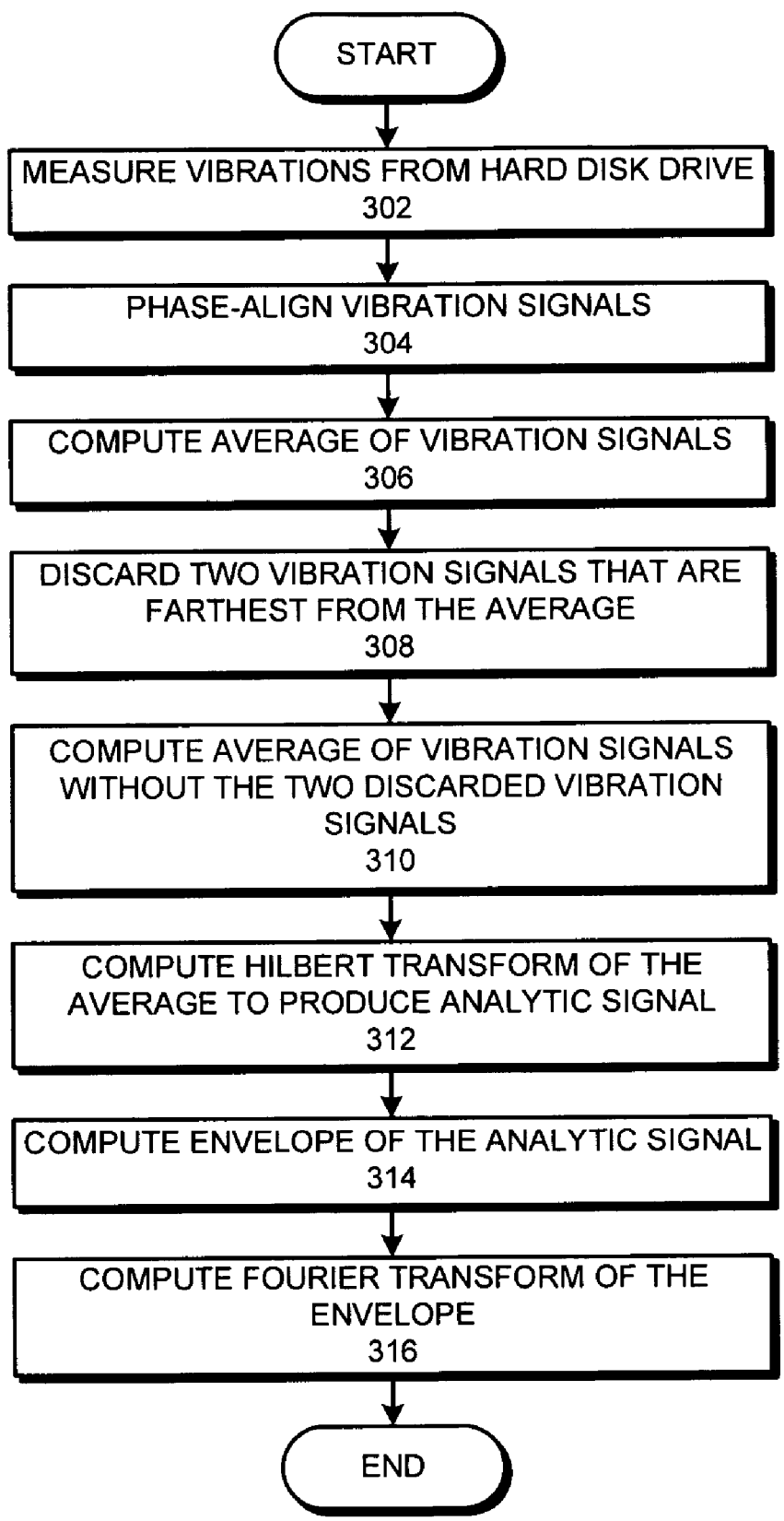
FIG. 3 presents a flow chart illustrating the process of computing a vibration signature for a hard disk drive in accordance with an embodiment of the present invention.

FIG. 3 presents a flow chart illustrating the process of computing a vibration signature for a hard disk drive in accordance with an embodiment of the present invention. The process begins when the system measures vibrations from the hard disk drive using an accelerometer (step 302). Note that the system collects N vibration signals during an idle phase between periods of disk activity (read/writes). The system then phase-aligns the N vibration signals (step 304)

Next, the system computes the average of the N vibration signals (step 306). The system then discards the two vibration signals that are farthest from the average (step 308), and computes the average of the vibration signals without the two discarded vibration signals (step 310). Next, the system computes the Hilbert transform of the averaged waveform to produce an analytic signal (step 312). The system then computes the envelope of the analytic signal (step 314) and computes the Fourier transform of the envelope to produce an idle-vibration signature of the hard disk drive (step 316).

In one embodiment of the present invention, the system generates a reference idle-vibration signature (RIVS) during a "training phase" (for example, when installing a new hard disk drive into a system). Note that the new hard disk drive is assumed to not be degraded or have defects in the spindle motor and the bearings during the training phase of data collection.

In one embodiment of the present invention, the system stores the RIVS of the hard disk drives in an easily accessible location such as a network file system, a local disk, or in memory. The RIVS represents the normal condition of the spindle motor and the bearings for the hard disk drive. The RIVS will be accessed frequently for comparisons with idle-vibration signatures obtained later in the life of the HDD.

Detecting the Onset of Hard Disk Drive Failure

Figure 4:
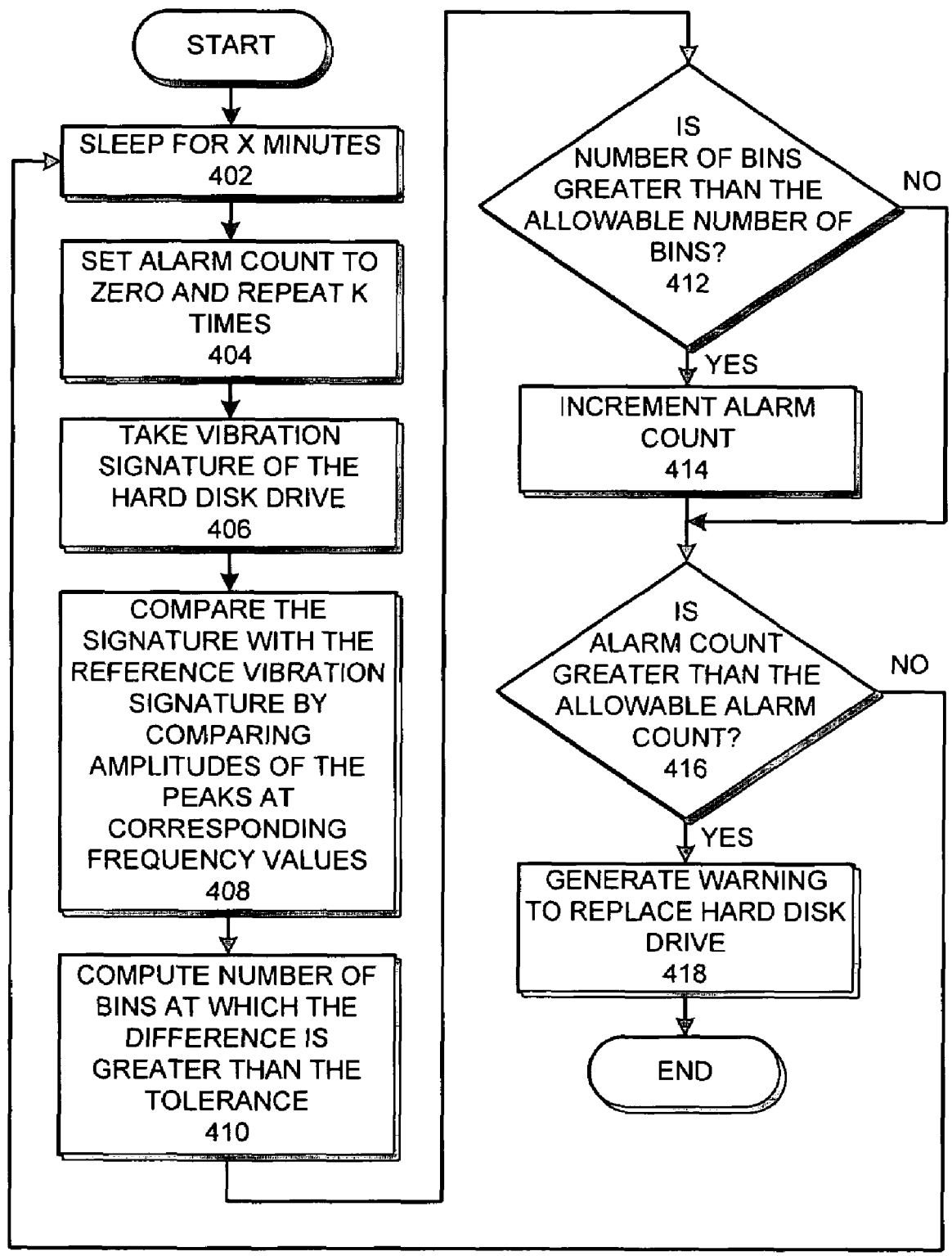
FIG. 4 presents a flow chart illustrating the process of determining whether a hard disk drive needs to be replaced in accordance with an embodiment of the present invention.

FIG. 4 presents a flow chart illustrating the process of determining whether a hard disk drive needs to be replaced in accordance with an embodiment of the present invention. The process begins when the system periodically monitors vibration signatures during normal operation of the hard disk drive. The system sleeps for X minutes (step 402), and sets the alarm count to zero and repeats the following steps K times (step 404). The system takes a current idle-vibration signature (CIVS) of the hard disk drive (step 406) (as is described in FIG. 3). Note that the system uses control variables or other mechanisms to assure that while acquiring the vibration signature for the hard disk drive, the hard disk drive is not seeking (reading or writing).

Next, the system compares the CIVS with the stored RIVS (step 408). The system examines the signature to see if there is the presence or absence of the reference peaks in the signature and/or the presence of peaks that were not seen in the reference signature. Note that both situations, namely the presence of new peaks and the absence of the reference peaks, indicate that an ongoing degradation of the spindle motor or bearings of the hard disk drive is taking place. This, in turn, indicates an elevated likelihood of a hard disk drive failure due to spindle motor and/or bearings problems The system then computes the number of bins at which the difference between the CIVS and RIVS is greater than a tolerance (step 410). If the number of bins is greater than the number of allowable bins (step 414), the system increments the alarm count (step 416).

Note that if the alarm count is greater than zero, indicating a developing problem, the system repeats steps 406 to 414 K times to assure that the CIVS is persistent and was not caused by an external shock.

If the alarm count is greater than the allowable alarm count (step 416), the system generates a warning to replace the hard disk drive or takes a remedial action.

Note that the values of the parameters N, K, k are determined experimentally for each brand and model of hard disk drives to meet specified false-alarm and missed-alarm rates.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting the onset of hard disk drive failure, comprising:
    measuring vibrations from the hard disk drive to produce one or more vibration signals during an idle phase for the hard disk drive;
    generating a vibration signature for the hard disk drive from the measured vibration signals;
    determining if the vibration signature indicates the onset of hard disk failure by comparing the vibration signature with a reference vibration signature for the hard disk drive, and
    if so, generating a warning or taking a remedial action.

2. The method of claim 1, wherein generating the vibration signature for the hard disk drive from the measured vibration signals involves:
    phase-aligning the vibration signals;
    computing the average of the vibration signals;
    computing an envelope for the average of the vibration signals; and
    computing the Fourier transform of the envelope for the average of the vibration signals.

3. The method of claim 2, wherein computing the average of the vibration signals involves:
    computing the average of the vibration signals;
    discarding two vibration signals that are farthest from the average; and
    computing the average of the vibration signals without the two discarded vibration signals.

4. The method of claim 2, wherein computing the envelope for the average of the vibration signals involves:
    computing the Hilbert transform of the average of the vibration signals to produce an analytic vibration signal; and
    computing the envelope for the analytic vibration signal.

5. The method of claim 1, wherein prior to measuring the vibration signals, the method further comprises:
    generating the reference vibration signature for the hard disk drive; and
    storing the reference vibration signature for the hard disk drive for future comparison with vibration signatures generated during subsequent operation of the hard disk drive.

6. The method of claim 1, wherein determining if the vibration signature indicates the onset of hard disk failure involves determining if a difference between the vibration signature and the reference vibration signature is greater than a tolerance.

7. The method of claim 1, wherein the vibration signals are measured by an accelerometer.

8. An apparatus for detecting the onset of hard disk drive failure, comprising:
    a hard disk drive;
    an accelerometer; and
    a failure-detection mechanism;
    wherein the failure-detection mechanism is configured to:
        measure vibrations from the hard disk drive to produce one or more vibration signals during an idle phase for the hard disk drive;
        generate a vibration signature for the hard disk drive from the measured vibration signals;
        determine if the vibration signature indicates the onset of hard disk failure by comparing the vibration signature with a reference vibration signature for the hard disk drive, and
        if so, to generate a warning or take a remedial action.

9. The apparatus of claim 8, wherein while generating the vibration signature for the hard disk drive from the measured vibration signals, the failure-detection mechanism is configured to:
  phase-align the vibration signals;
  compute the average of the vibration signals; compute an envelope for the average of the vibration signals; and to
  compute the Fourier transform of the envelope for the average of the vibration signals.

10. The apparatus of claim 9, wherein while computing the average of the vibration signals, the failure-detection mechanism is configured to:
  compute the average of the vibration signals;
  discard two vibration signals that are farthest from the average; and to
  compute the average of the vibration signals without the two discarded vibration signals.

11. The apparatus of claim 9, wherein while computing the envelope for the average of the vibration signals, the failure-detection mechanism is configured to:
  compute the Hilbert transform of the average of the vibration signals to produce an analytic vibration signal; and to
  compute the envelope for the analytic vibration signal.

12. The apparatus of claim 8, wherein prior to measuring the vibration signals, the failure-detection mechanism is configured to:
  generate the reference vibration signature for the hard disk drive; and to
  store the reference vibration signature for the hard disk drive for future comparison with vibration signatures generated during subsequent operation of the hard disk drive.

13. The apparatus of claim 8, wherein while determining if the vibration signature indicates the onset of hard disk failure, the failure- detection mechanism is configured to determine if a difference between the vibration signature and the reference vibration signature is greater than a tolerance.

14. The apparatus of claim 8, wherein the vibration signals are measured by an accelerometer.

15. A computer system for detecting the onset of hard disk drive failure, comprising:
  a hard disk drive;
  an accelerometer; and
  a failure-detection mechanism;
  wherein the failure-detection mechanism is configured to:
    measure vibrations from the hard disk drive during an idle phase for the hard disk drive to produce one or more vibration signals;
    generate a vibration signature for the hard disk drive from the measured vibration signals;
  determine if the vibration signature indicates the onset of hard disk failure by comparing the vibration signature with a reference vibration signature for the hard disk drive, and
  if so, to generate a warning or take a remedial action.

16. The computer system of claim 15, wherein while generating the vibration signature for the hard disk drive from the measured vibration signals, the failure-detection mechanism is configured to:
  phase-align the vibration signals;
  compute the average of the vibration signals;
  compute an envelope for the average of the vibration signals; and to
  compute the Fourier transform of the envelope for the average of the vibration signals.

17. The computer system of claim 16, wherein while computing the average of the vibration signals, the failure-detection mechanism is configured to:
  compute the average of the vibration signals;
  discard two vibration signals that are farthest from the average; and to
  compute the average of the vibration signals without the two discarded vibration signals.

18. The computer system of claim 16, wherein while computing the envelope for the average of the vibration signals, the failure-detection mechanism is configured to:
  compute the Hilbert transform of the average of the vibration signals to produce an analytic vibration signal; and to
  compute the envelope for the analytic vibration signal.

* * * * *